(12) United States Patent
Smith

(10) Patent No.: US 6,923,082 B1
(45) Date of Patent: Aug. 2, 2005

(54) RIGHT ANGLE SENSOR

(76) Inventor: William L. Smith, 201 Kentwood La., Pisgah Forest, NC (US) 28768

(*) Notice: Subject to any disclaimer, the term of this patent is extended or adjusted under 35 U.S.C. 154(b) by 61 days.

(21) Appl. No.: 10/409,026

(22) Filed: Apr. 8, 2003

Related U.S. Application Data

(60) Continuation of application No. 09/973,489, filed on Oct. 9, 2001, now Pat. No. 6,543,304, which is a division of application No. 09/339,530, filed on Jun. 24, 1999, now Pat. No. 6,298,739, which is a division of application No. 08/903,569, filed on Jul. 31, 1997, now Pat. No. 5,918,292.

(51) Int. Cl.$^7$ .......................................... G01M 19/00
(52) U.S. Cl. .................................................. 73/866.5
(58) Field of Search ........................ 73/866.5; 374/208

(56) References Cited

U.S. PATENT DOCUMENTS

| | | | |
|---|---|---|---|
| 2,838,935 A * | 6/1958 | Di Cecio et al. ....... | 374/208 X |
| 3,681,990 A * | 8/1972 | Barrett et al. ............... | 374/154 |
| 4,495,810 A * | 1/1985 | Tessarzik et al. .......... | 73/866.5 |
| 4,823,602 A * | 4/1989 | Christensen, Jr. ....... | 73/866.5 X |
| 5,006,797 A * | 4/1991 | Smith ......................... | 324/173 |
| 5,303,602 A * | 4/1994 | Morgan ..................... | 73/866.5 |
| 5,691,636 A * | 11/1997 | Allshouse et al. ..... | 324/207.15 |
| 5,727,498 A * | 3/1998 | Hackler et al. ......... | 73/866.5 X |
| 5,918,292 A * | 6/1999 | Smith ......................... | 73/866.5 |
| 6,231,230 B1 * | 5/2001 | Baldock et al. ............ | 374/208 |
| 6,298,739 B1 * | 10/2001 | Smith ......................... | 73/866.5 |
| 6,575,048 B1 * | 6/2003 | Tow ........................... | 73/866.5 |

FOREIGN PATENT DOCUMENTS

| | | | | |
|---|---|---|---|---|
| BE | 1009143 A3 * | 12/1996 | ........... | G01D 11/30 |
| EP | 640395 A1 * | 3/1995 | ................ | 83/468.4 |
| JP | 08110242 A * | 4/1996 | ........... | G01K 01/14 |

\* cited by examiner

*Primary Examiner*—Thomas P. Noland
(74) *Attorney, Agent, or Firm*—Womble Carlyle Sandridge & Rice, PLLC; C. Robert Rhodes

(57) ABSTRACT

A sensor probe assembly. The sensor probe assembly includes a sensor probe body having a probe head and an elongated cylindrical probe shaft for housing a sensing element. An adapter attaches the probe body to a sensor location while allowing the sensor probe body to rotate with respect to the adapter. In the preferred embodiment, at least one resilient seal is located between the probe head and the adapter to prevent entry of dirt, oil and grease.

4 Claims, 2 Drawing Sheets

RIGHT ANGLE SENSOR

REFERENCE TO RELATED APPLICATIONS

This application is a continuation of utility application Ser. No. 09/973,489 filed Oct. 9, 2001, now U.S. Pat. No. 6,543,304, which a division of utility application Ser. No. 09/339,530, filed Jun. 24, 1999, now U.S. Pat. No. 6,298,739, which is a division of utility application Ser. No. 08/903,569, filed Jul. 31, 1997, now U.S. Pat. No. 5,918,292.

BACKGROUND OF THE INVENTION (1) Field of the Invention

The present invention relates generally to sensor probes and, more particularly, to a right angle sensor for use on machinery and transportation equipment including locomotives or the like.

(2) Description of the Prior Art

In order to produce reliable and reproducible readings, a sensor assembly generally must be positioned in a specific orientation with respect to an object being measured. Most heavy-duty industrial sensors are cumbersome to install and awkward to position, especially within a tight, limited space. This is because presently available sensor assemblies include an attachment mechanism that is fixedly attached to the probe shaft and cable. When the sensor assembly is to be threaded into an object, the entire sensor assembly must be rotated to engage the threads. This requires a large amount of space as the length and size of the sensor assembly is often substantial. This space requirement restricts the use of most sensor assemblies in tight areas where there is not ample space for movement.

Furthermore, as the attachment mechanism is tightened into the object, the orientation of the cable is dependent upon the attachment mechanism. If the threads tighten when the cable is positioned in an undesirable orientation, the attachment must either be additionally tightened which may strip the threads or loosened which results in insecure attachment that could cause the sensor assembly to come loose. Also, the fixed attachment of the attachment means prohibits the free movement of the cable relative to the probe shaft and body. However, fixed attachment is normally required in order to provide a seal between the sensed medium and the outside environment. For example, a right angle temperature sensor used to monitor the temperature of oil in an engine must also prevent oil from leaking from around the sensor assembly. This results in most sensor assembly being unacceptable for use in moving or swiveling applications.

Thus, there remains a need for a new and improved sensor assembly which allows for free turning of the sensor to permit easy installation and allows for removal and re-installation of the sensor without twisting or disconnecting the exit cable while, at the same time, prevents the ingress or egress of oil or water or other debris from the sensed environment.

SUMMARY OF THE INVENTION

The present invention is directed to a sensor probe assembly. The sensor probe assembly includes a sensor probe body having a probe head and an elongated cylindrical probe shaft for housing a sensing element. An adapter attaches the probe body to a sensor location while allowing the sensor probe body to rotate with respect to the adapter.

In the preferred embodiment, the adapter includes a generally cylindrical body having an aperture smaller in diameter than the probe head extending lengthwise for receiving the probe shaft. One end of the adapter is threaded for attaching the adapter to the sensor location. A nose piece is threaded onto the distal end of the probe shaft to prevent the probe shaft from being withdrawn through the body aperture.

Also in the preferred embodiment, at least one resilient seal is located between the probe head and the adapter to prevent entry of dirt, oil and grease.

Accordingly, one aspect of the present invention is to provide a sensor probe assembly including: (a) a sensor probe body including a probe head and a sensing element; and (b) an adapter for receiving the sensor probe body and attaching to a sensor location, the adapter adapted to independently rotate about the sensor probe body.

Another aspect of the present invention is to provide an adapter for mounting a sensor probe body having a probe head and an elongated cylindrical probe shaft for housing a sensing element. The adapter including: (a) a generally cylindrical body having an aperture smaller in diameter than the probe head extending lengthwise for receiving the probe shaft; (b) means for attaching the adapter to a sensor location; and (c) means attached to the distal end of the probe shaft to prevent the probe shaft from being withdrawn through the body aperture.

Still another aspect of the present invention is to provide a sensor probe assembly including: (a) a sensor probe body having a probe head and an elongated cylindrical probe shaft for housing a sensing element; (b) an adapter for attaching the probe body to a sensor location, the adapter including: (i) a generally cylindrical body having an aperture smaller in diameter than the probe head extending lengthwise for receiving the probe shaft; (ii) means for attaching the adapter to the sensor location; and (iii) means attached to the distal end of the probe shaft to prevent the probe shaft from being withdrawn through the body aperture; and (c) at least one resilient seal between the probe head and the adapter.

These and other aspects of the present invention will become apparent to those skilled in the art after a reading of the following description of the preferred embodiment when considered with the drawings.

DESCRIPTION OF THE PREFERRED EMBODIMENTS

Figure 1:
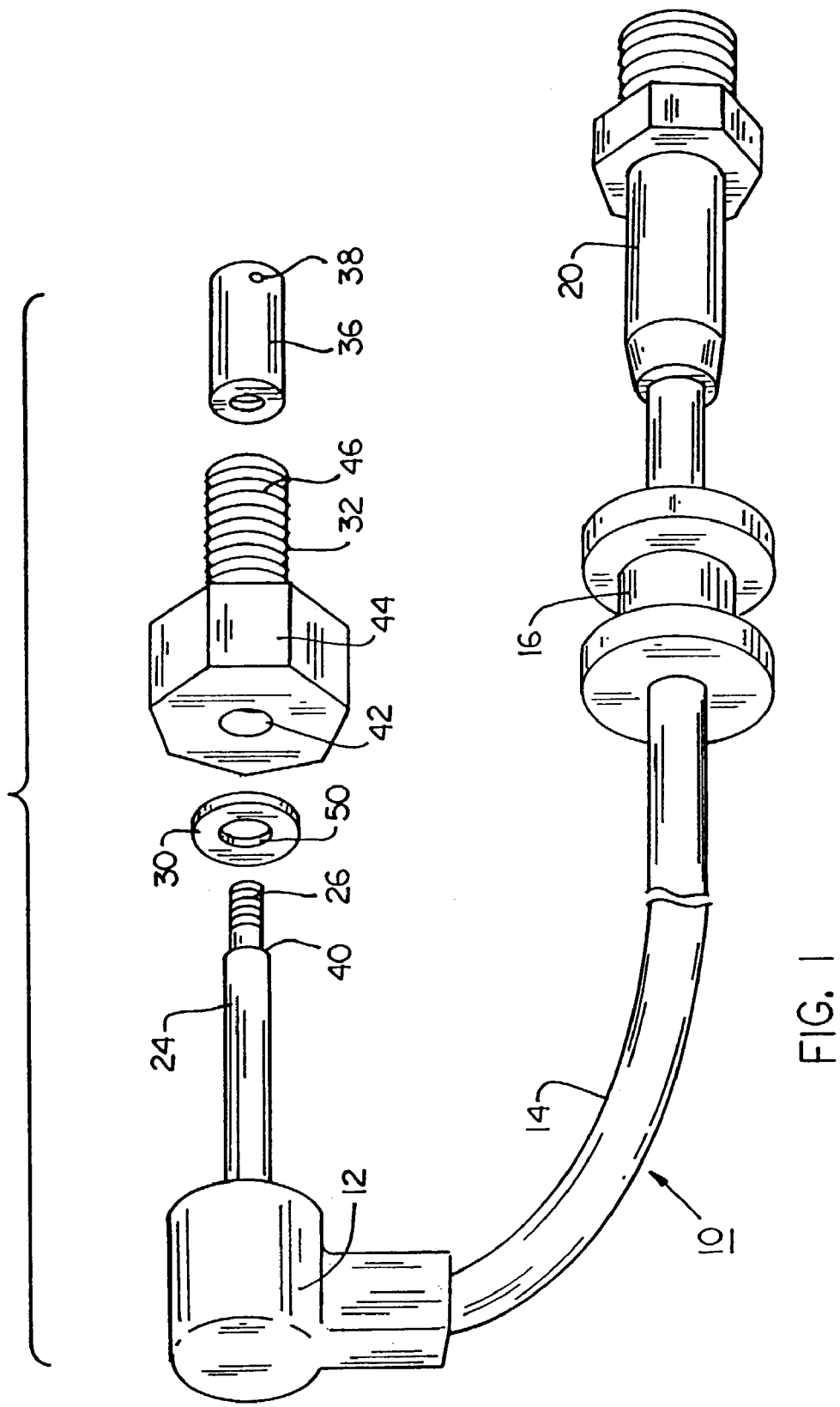
FIG. 1 is an exploded view of a right angle sensor assembly constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a sensor assembly, generally designated 10, is shown constructed according to the present invention. The right angle sensor 10 includes a probe head 12 from which a probe shaft 24 extends and further having a threaded collar 26 at the distal end opposite the probe head. A seal 30 and non-rotating collar 32 are positioned around the probe shaft 24. A nose piece 36 is attached onto the distal end of the probe shaft 24 to retain the collar and seal. A surface, such as an aperture 38, allows a tool to be used to tighten nose piece 36. An exit cable 14 extends from the probe head 12 for connection to the measuring instrument, display or control system (not shown).

The probe head 12 connects the exit cable 14 with the probe shaft 24. The probe head 12 may be constructed to allow the angle between the exit cable 14 and the probe shaft 24 to be substantially straight (in-line) or may range to include a substantially right angle as shown. Probe head 12 provides a substantially rigid support that prevents movement of the probe shaft 24 or exit cable 14.

The probe shaft 24 is an elongated member extending from the probe head 12. A shoulder 40 is positioned a distance from the probe head to prevent over tightening of the seal 30 by the nose piece 36. The diameter of the probe shaft 24 between the probe head and shoulder is substantially equal to the diameter of the non-rotating collar aperture 42 to provide for a generally tight fit when the non-rotating collar is positioned onto the shaft.

The probe shaft from the shoulder 40 to the distal end is sized for engagement of the nose piece 36. In the preferred embodiment, a threaded collar 26 at the distal end of the probe shaft allows for mounting of the nose piece 36. The probe shaft may include a secondary metal sheath to protect the sensor itself.

Figure 2:
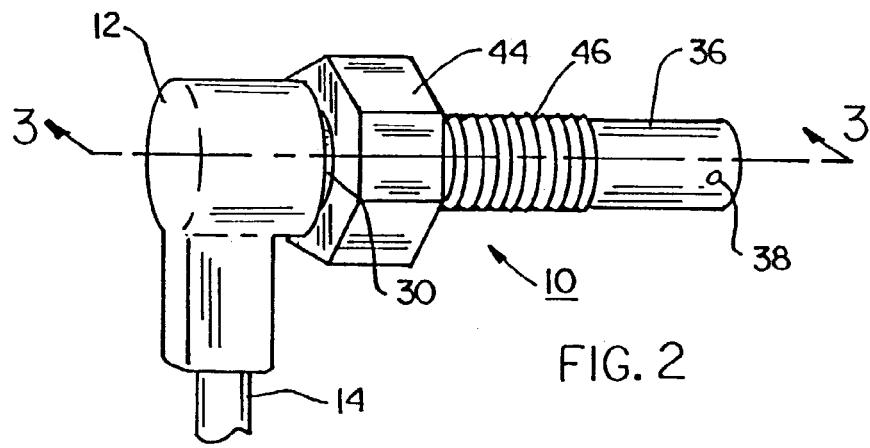
FIG. 2 is an enlarged perspective view of the sensor assembly shown in FIG. 1.
Figure 3:
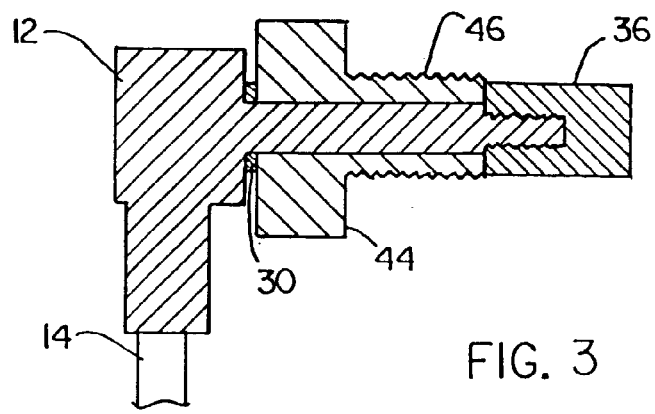
FIG. 3 is a longitudinal cross sectional view of the sensor of FIG. 2 taken along line 3—3.

The seal 30 is substantially flat and has an aperture 50 substantially equal to the diameter of the probe shaft 24 to allow it to be seated firmly between the non-rotating collar 32 and probe head 12 as shown in FIG. 2. In the preferred embodiment, the seal 30 has an outer diameter between about $1/16^{th}$ of an inch to $1/2$ of an inch and preferably is about $1/8^{th}$ of an inch. However, the actual dimensions of the seal may be varied to fit with respect to the dimensions of the collar 32 and probe head 12. The seal is formed from an elastomeric material suitable for the specific application and environment. In the preferred embodiment, the seal is formed from a thermoplastic rubber having a durometer of between about 45 to 95 provide a seal between the mating surfaces of probe head 12 and attachment 44 when compressed by nose piece 36.

Figure 4:
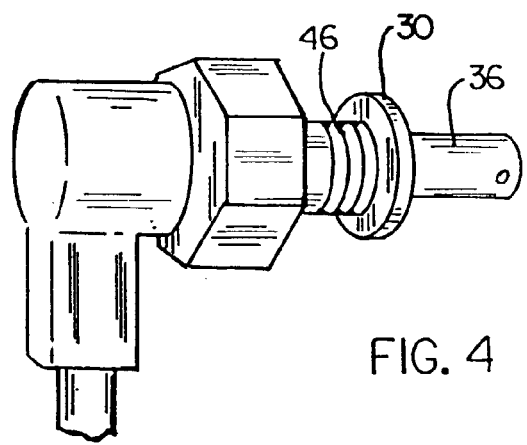
FIG. 4 is an alternative embodiment of the present invention having the seal at the distal end of the probe shaft.

The seal could be positioned at the distal end of probe shaft 24 for less critical environments. For example, as shown in FIG. 4, the seal 30 is positioned between the non-rotating collar 32 and nose piece 36. It will be understood by one of ordinary skill in the art that the seal may be constructed in a variety of shapes and sizes without departing from the spirit of the present invention.

When the nose piece is tightened onto the probe shaft, the seal is put under compression thereby preventing the probe shaft and sensing element contained therein from too easily rotating. The seal 30 also seals gap between the probe head 12 and collar 32 to keep out elements such as water, dirt, or grease. Additionally, in the preferred embodiment, the seal is substantially smooth to allows rotation between the probe head and collar, thereby allowing movement of the exit cable 14 as it moves or swivels yet still acting as a seal. In another embodiment, the seal 30 may also include an additional "O" ring positioned within the non-rotating collar 32 to provide additional sealing for severe environments.

In the preferred embodiment, the non-rotating collar 32 includes a hexhead 44 and threaded end 46. The hexhead 44 provides for tightening the non-rotating collar into its permanent position. Preferably, the hexhead 44 is shaped for ease of installation, such as tightening with a wrench. The threaded end 46 is used for attachment into the sensing location of, for example, the slump pan of an engine or a bearing housing.

An aperture 42 is positioned in the center of the non-rotating collar 32 and extends through the entire piece. The aperture is sized to allow placement of the non-rotating collar 32 over the probe shaft 24. The length of the non-rotating collar 32 is somewhat less than equal to the distance between the probe head 12 and shoulder 40 in order to compress the seal 30 when nose piece 36 is tightened.

The nose piece 36 is positioned over the distal end of the probe shaft 24. The interior end of the nose piece is threaded for engagement with the threaded collar 26 of the probe shaft 24. Both ends of the nose piece 36 may be open to allow the distal end of the probe shaft 24 to extend pass the edge of the nose piece to help provide more accurate sensor readings but in some cases one end of the nose piece is closed to protect the sensing element. The length of the nose piece is generally equal to the distance of the probe shaft shoulder to the distal end but may be varied to accommodate specific application needs. However, shoulder 40 ensures the nose piece is not over-tightened when threaded onto the shaft.

The exit cable 14 extends from the probe head 12 and to a final connection node, lead or connector 20 as shown in FIG. 1. The exit cable 14 is preferably flexible and may have an armor covering, such as an interlocked flexible tube, which provides protection for the cable and conductors. Additional elements, such as a grommet 16 may be placed on the exit cable as needed to provide additional sealing or protection of the cable.

When the sensor is installed, the threaded end 46 is engaged with a receiving end of an object. The non-rotating collar can be screwed in independently leaving the remaining elements to be freely adjust and positioned. Therefore, removal and re-installation of the sensor can be accomplished without twisting or disconnecting the exit cable. The exit cable can be positioned at any angle around the 360° of rotation which allows for the cable to be used in a variety of positions that previous sensors were unable to fit. Additionally, the cable can move or swivel independent of the non-rotating collar attachment.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A sensing probe assembly comprising:
   (a) a sensor probe including a probe head and a probe shaft with sensing element associated therewith extending from the probe head along an axis;
   (b) a collar having an aperture extending therethrough along the axis of the probe shaft, the collar being attachable to a sensor location;
   (c) the diameter of the aperture being greater than and receiving the probe shaft;
   (d) a cable carrying electrical signals from the probe shaft extending angularly from the probe head at an angle of up to 90° with respect to the axis of the probe shaft;

(e) the probe head being selectively held against the collar at one of an infinite number of prescribed angular positions with the cable extending angularly therefrom in a desired direction.

2. The sensor probe assembly according to claim 1 wherein the adapter includes:
   (a) a generally cylindrical body with said aperture being smaller in diameter than said probe head;
   (b) the probe shaft being axially fixed with respect to the collar to prevent withdrawal of the probe shaft through the body aperture, while permitting rotation of the collar with respect to the probe shaft.

3. The sensor probe assembly according to claim 2 wherein the probe shaft is axially fixed with respect to the collar by means of a generally cylindrical nose piece having a diameter greater than the body aperture, and wherein the distal end of the sensing includes external threads and the nose piece includes enterer threads for attachment thereto.

4. The sensor probe assembly according to claim 1 and further including at least one resilient seal between the probe head and the adapter.

* * * * *

UNITED STATES PATENT AND TRADEMARK OFFICE
CERTIFICATE OF CORRECTION

PATENT NO. : 6,923,082 B1
DATED : August 2, 2005
INVENTOR(S) : William L. Smith

It is certified that error appears in the above-identified patent and that said Letters Patent is hereby corrected as shown below:

Column 6,
Lines 1-6, cancel the text beginning with "3. The sensor probe" and ending with "for attachment thereto" and insert the following claim:
-- 3. The sensor probe assembly according to claim 2 wherein the probe shaft is axially fixed with respect to the collar by means of a generally cylindrical nose piece having a diameter greater than the body aperture, and wherein the distal end of the sensing includes external threads and the nose piece includes internal threads for attachment thereto. --.

Signed and Sealed this

Fifteenth Day of November, 2005

JON W. DUDAS
*Director of the United States Patent and Trademark Office*